(12) United States Patent
Kanai (10) Patent No.: US 8,915,542 B2
(45) Date of Patent: Dec. 23, 2014

(54) SUNROOF APPARATUS

(71) Applicant: Yachiyo Industry Co., Ltd., Sayama-shi, Saitama (JP)

(72) Inventor: Toshiyuki Kanai, Sakura (JP)

(73) Assignee: Yachiyo Industry Co., Ltd., Sayama-Shi (JP)

( * ) Notice: Subject to any disclaimer, the term of this patent is extended or adjusted under 35 U.S.C. 154(b) by 0 days.

(21) Appl. No.: 13/972,251

(22) Filed: Aug. 21, 2013

(65) Prior Publication Data

US 2014/0054932 A1    Feb. 27, 2014

(30) Foreign Application Priority Data

Aug. 22, 2012  (JP) ................. 2012-183043

(51) Int. Cl.
  *B60J 7/043*  (2006.01)
  *B60J 10/12*  (2006.01)
  *B60J 7/16*  (2006.01)
(52) U.S. Cl.
  CPC ............. *B60J 7/1642* (2013.01); *B60J 10/12* (2013.01); *B60J 7/043* (2013.01)
  USPC ............. 296/216.06; 296/216.07; 296/216.09
(58) Field of Classification Search
  CPC ........... B60J 7/043; B60J 7/1642; B60J 10/12
  USPC ............................................. 296/216.01–224
  See application file for complete search history.

(56) References Cited

U.S. PATENT DOCUMENTS 4,729,596 A * 3/1988 Fujihara et al. .............. 296/218
5,950,366 A * 9/1999 Uhlmeyer .................... 49/484.1

FOREIGN PATENT DOCUMENTS

JP    2010-260393    11/2010

* cited by examiner

*Primary Examiner* — Dennis H Pedder
(74) *Attorney, Agent, or Firm* — Rankin, Hill & Clark LLP (57) ABSTRACT

A sunroof apparatus includes a movable roof panel including a front edge connected to an upper edge of a front window without a roof outer plate interposed between the roof panel and the front window for closing an opening portion of a roof; a seal member disposed at a circumference of an edge portion of the opening portion; a front panel holder fixed to a lower surface of at least the front edge of the roof panel for reinforcing the roof panel, wherein during closing of the opening portion of the roof, the front panel holder pressingly contacts the seal member disposed at the front edge of the roof panel, and a lower surface of the roof panel pressingly contacts directly the seal member disposed at a rear edge of the roof panel.

1 Claim, 10 Drawing Sheets

SUNROOF APPARATUS

CROSS-REFERENCE TO RELATED APPLICATIONS

This application is based upon and claims the benefit of priority from Japanese Patent Application No. 2012-183043 filed on Aug. 22, 2012; the entire contents of which are incorporated herein by reference.

FIELD OF THE INVENTION

The present invention relates to a sunroof apparatus of a vehicle.

BACKGROUND OF THE INVENTION

A technology (see, for example, JP2010-260393A) has been known that discloses a sunroof apparatus having a reinforcement panel holder installed under a roof panel and that ensures the roof panel watertight by pressingly contacting this panel holder on a seal member disposed at its opening edge.

SUMMARY OF THE INVENTION

When the panel holder pressingly contacts the seal member, however, the panel holder and the seal member are arranged vertically in parallel with each other. As a result, the sunroof apparatus has an increased thickness in a height direction. Unfortunately, this construction tends to cause decreased head clearance in a vehicle interior.

The present invention is directed to a sunroof apparatus having increased head clearance in a vehicle interior.

An aspect of the invention provides a sunroof apparatus including a movable roof panel including a front edge connected to an upper edge of a front window without a roof outer plate interposed between the roof panel and the front window for closing an opening portion of a roof; a seal member disposed at a circumference of an edge portion of the opening portion; and a front panel holder fixed to a lower surface of at least the front edge of the roof panel for reinforcing the roof panel. During closing of the opening portion of the roof, the front panel holder pressingly contacts the seal member disposed at the front edge of the roof panel, and a lower surface of the roof panel pressingly contacts directly the seal member disposed at a rear edge of the roof panel.

In the aspect of the invention, the roof panel includes a side edge fixed to a side panel holder and the rear edge fixed to a rear panel holder. During closing of the opening portion of the roof, the side panel holder pressingly contacts the seal member at the side edge of the roof panel. A rear end of the side panel holder and left and right ends of the rear panel holder are connected by a rear joint member. The rear joint member includes, on a lower surface thereof, an inclined surface which is inclined upward as extending rearward with a rear end thereof coming in the vicinity of or in contact with the lower surface of the roof panel. The inclined surface of the rear joint member pressingly contacts the seal member extending from a pressure-contact portion with the side panel holder to a pressure-contact portion with the lower surface of the rear edge of the roof panel.

BRIEF DESCRIPTION OF THE DRAWINGS

FIGS. 12A and 12B are side views illustrating a rear edge portion of a roof panel and depict a watertight state of a seal member.

In Figures, VF denotes a forward direction of a vehicle, and VR denotes a rearward direction of the vehicle.

DETAILED DESCRIPTION OF THE PREFERRED EMBODIMENTS

Figure 1:
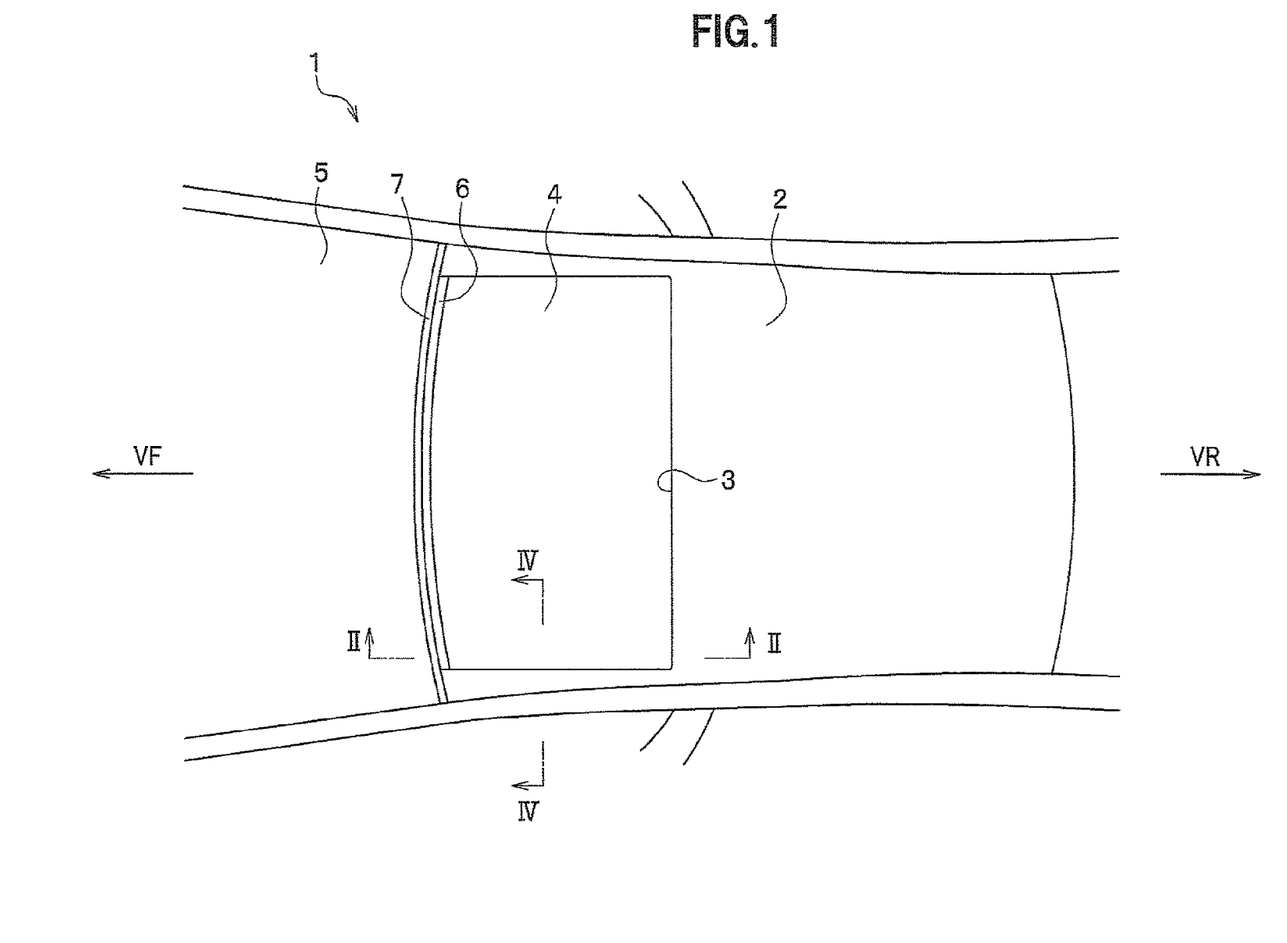
FIG. 1 is a plane view of a sunroof apparatus according to an embodiment of the present invention.

As illustrated in FIG. 1, a sunroof apparatus 1 according to an embodiment of the present invention can be optionally open or closed with respect to an opening portion 3 of a fixed roof 2 of a vehicle. The sunroof apparatus 1 includes an outer sliding roof panel 4 which is tilted up and moves rearward during the course of its opening. The roof panel 4 is made of, for example, a glass or a resin panel.

Figure 2:
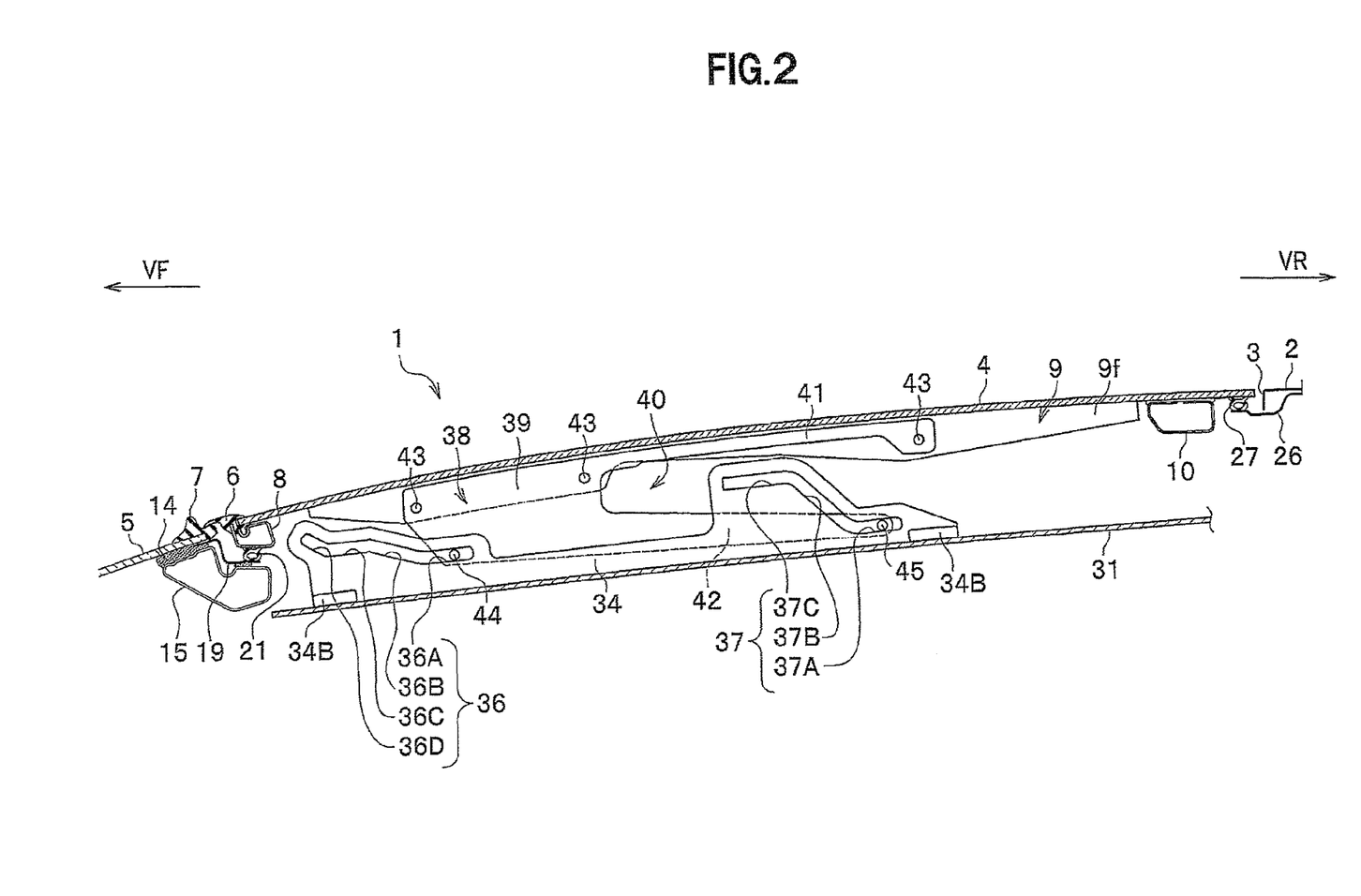
FIG. 2 is a cross-sectional view taken along II-II of FIG. 1.
Figure 5:
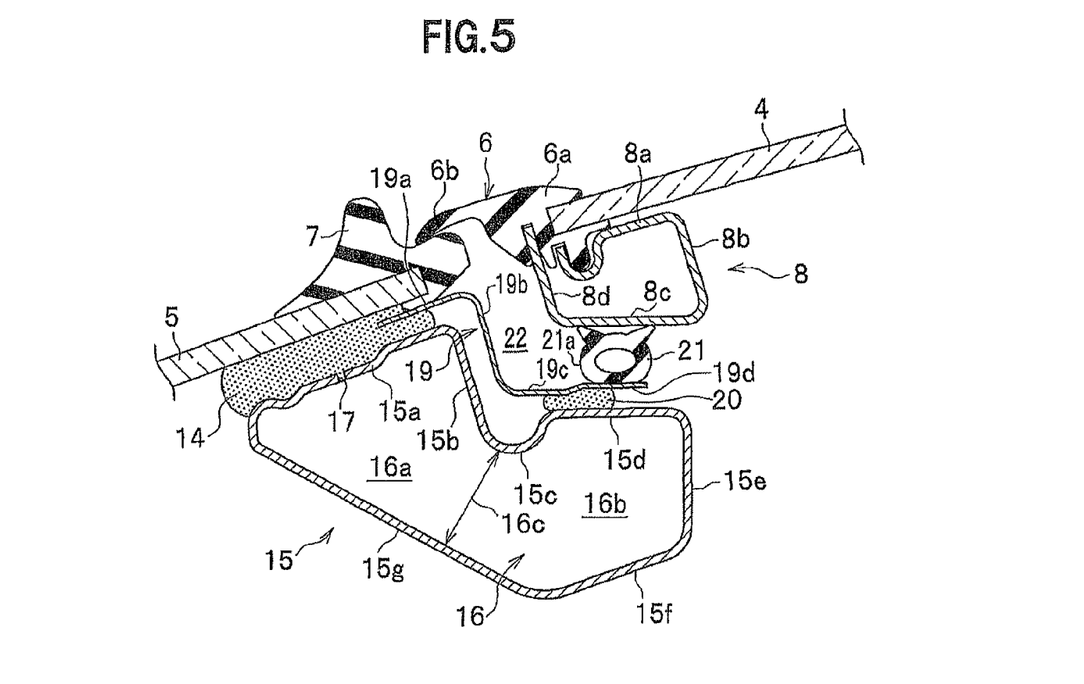
FIG. 5 is an enlarged sectional view illustrating a front edge portion of the roof panel of FIG. 2.

The opening portion 3 has a structure in which an outer roof board of the fixed roof 2 is rectangularly cut out from the front edge. Conventionally, a roof panel is continuous to the rear of the outer roof board when closed. In contrast, the left and right edges and the rear edge of a closed roof panel 4 shown in FIG. 1 are continuous to the outer roof board of the fixed roof 2. The front edge of the roof panel 4 is directly continuous to the upper edge of a front window 5 without the outer roof board therebetween. Strictly speaking, for example, a rubber weatherstrip 6 fixed to the front edge of the roof panel 4 lightly contacts a rubber weatherstrip 7 fixed to the upper edge of the front window 5 as illustrated in FIG. 2. Accordingly, the front edge of the roof panel 4 and the upper edge of the front window 5 should be flush with each other. As shown in FIG. 5, the weatherstrip 6 includes: a base portion 6a fixed to the front edge of the roof panel 4; and a thin tongue-shaped lip portion 6b extending forward from the front end of the base portion 6a. The tip of the lip portion 6b of the weatherstrip 6 slightly contacts the upper rear surface portion of the weatherstrip 7.

In FIG. 2, in order to reinforce the roof panel 4, the lower surfaces of the front edge, side edges, and rear edge of the roof panel 4 have a front panel holder 8, side panel holders 9, and a rear panel holder 10, respectively, installed by using, for example, adhesive. The front panel holder 8, side panel holders 9, and rear panel holder 10 are made of, for example, a metal member such as a galvanized steel sheet.

As illustrated in FIG. 5, the front panel holder 8 includes, in the cross section, an upper surface portion 8a that extends slightly upward along the inclined surface of the front edge of the roof panel 4. The front panel holder 8 has a rear surface portion 8b that extends downward from the rear end of the upper surface portion 8a that is substantially perpendicular to the panel plane of the roof panel 4. The front panel holder 8 has a lower surface portion 8c that extends substantially horizontally and forward from the lower end of the rear surface portion 8b. The front panel holder 8 has a front surface portion 8d that extends substantially horizontally and upward from the front end of the lower surface portion 8c that is substantially perpendicular to the panel plane of the roof panel 4. In addition, the upper end portion of the front surface portion 8d is embedded in the base portion 6a of the weatherstrip 6. The front end portion of the upper surface portion 8a is bent in a U-shape to be recessed in a downward direction, and engages with part of the base portion 6a of the weatherstrip 6. As described above, the front panel holder 8 is fixed to the lower surface of the roof panel 4 with weatherstrip 6 interposed therebetween. Meanwhile, the upper surface portion 8a of the front panel holder 8 may be bonded with adhesive to the lower surface of the roof panel 4 as an additional or alternative structure.

Figure 4:
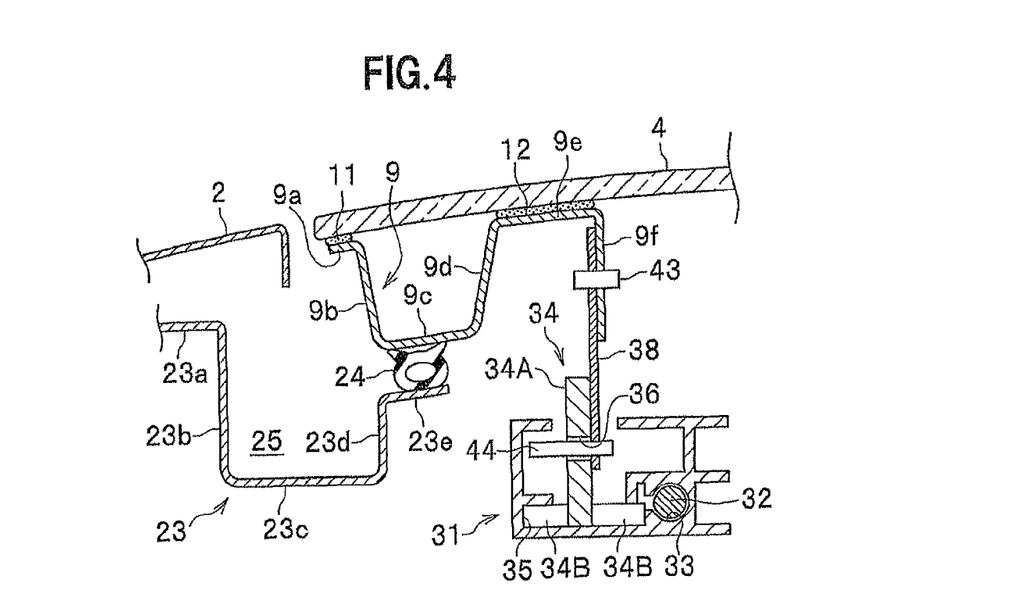
FIG. 4 is a cross-sectional view taken along IV-IV of FIG. 1.

As illustrated in FIG. 4, the side panel holder 9 includes, in the cross section, a first upper surface portion 9a that is fixed with an adhesive 11 to the lower surface of the side edge of the roof panel 4. The side panel holder 9 has a first side surface portion 9b that extends from the end of the first upper surface portion 9a at a center side in a vehicle widthwise direction, in a downward direction that is substantially perpendicular to the panel plane of the roof panel 4. The side panel holder 9 has a lower surface portion 9c that extends from the lower end of the first side surface portion 9b and is in substantially parallel with the panel plane of the roof panel 4. In addition, the lower surface portion 9c is somewhat inclined upward toward a center side in the vehicle widthwise direction. The side panel holder 9 has a second side surface portion 9d that extends upward from the end of the lower surface portion 9c, which is at a center side in the vehicle widthwise direction. The side panel holder 9 has a second upper surface portion 9e that extends from the upper end of the second side surface portion 9d toward the center in the vehicle widthwise direction and that attaches with adhesive 12 to the lower surface of the roof panel 4. The side panel holder 9 has a bracket portion 9f of a substantially vertical plate that extends downward from the end of the second upper surface portion 9e at a center side in the vehicle widthwise direction. The first side surface portion 9b, the lower surface portion 9c, and the second side surface portion 9d, which are formed to make an enclosure with the lower surface of the roof panel 4, define a sectional closed space as a reinforcement function. The bracket portion 9f is connected to a panel support stay 38 as described below.

Figure 7:
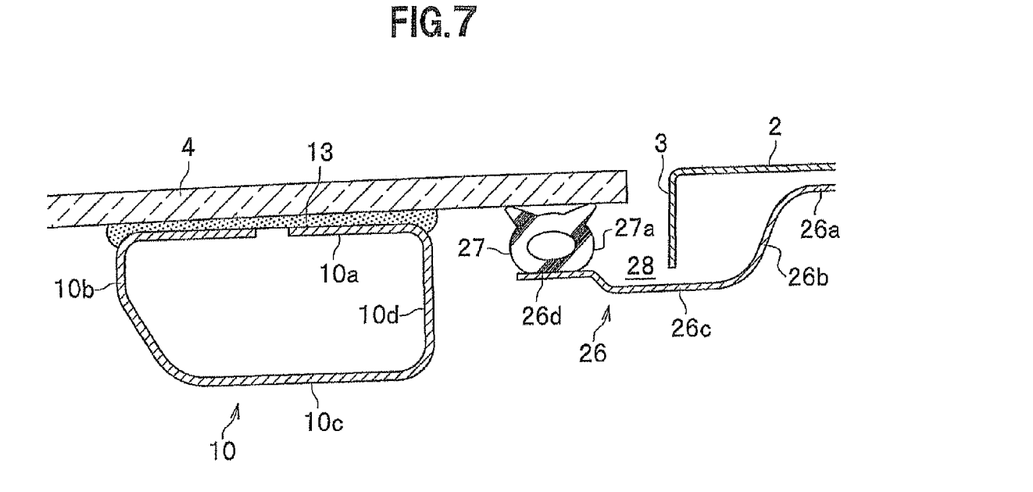
FIG. 7 is an enlarged sectional view illustrating a rear edge portion of the roof panel of FIG. 2.

As illustrated in FIG. 7, a rear panel holder 10 includes, in the cross section, an upper surface portion 10a that attaches with adhesive 13 to the lower surface of the rear edge of the roof panel 4. The rear panel holder 10 has a front surface portion 10b that extends downward from the front end of the upper surface portion 10a. The rear panel holder 10 has a lower surface portion 10c that extends in substantially parallel with the panel plane of the roof panel 4 and rearward from the lower end of the front surface portion 10b. The rear panel holder 10 has a rear surface portion 10d that extends upward from the rear end of the lower surface portion 10c and is connected to the rear end of the upper surface portion 10a. These four surfaces define an approximately rectangular sectional closed space. The rear panel holder 10 is fixed onto the lower surface that is positioned a little forward of the very end of the rear edge of the roof panel 4.

Figures 11A, 11B:
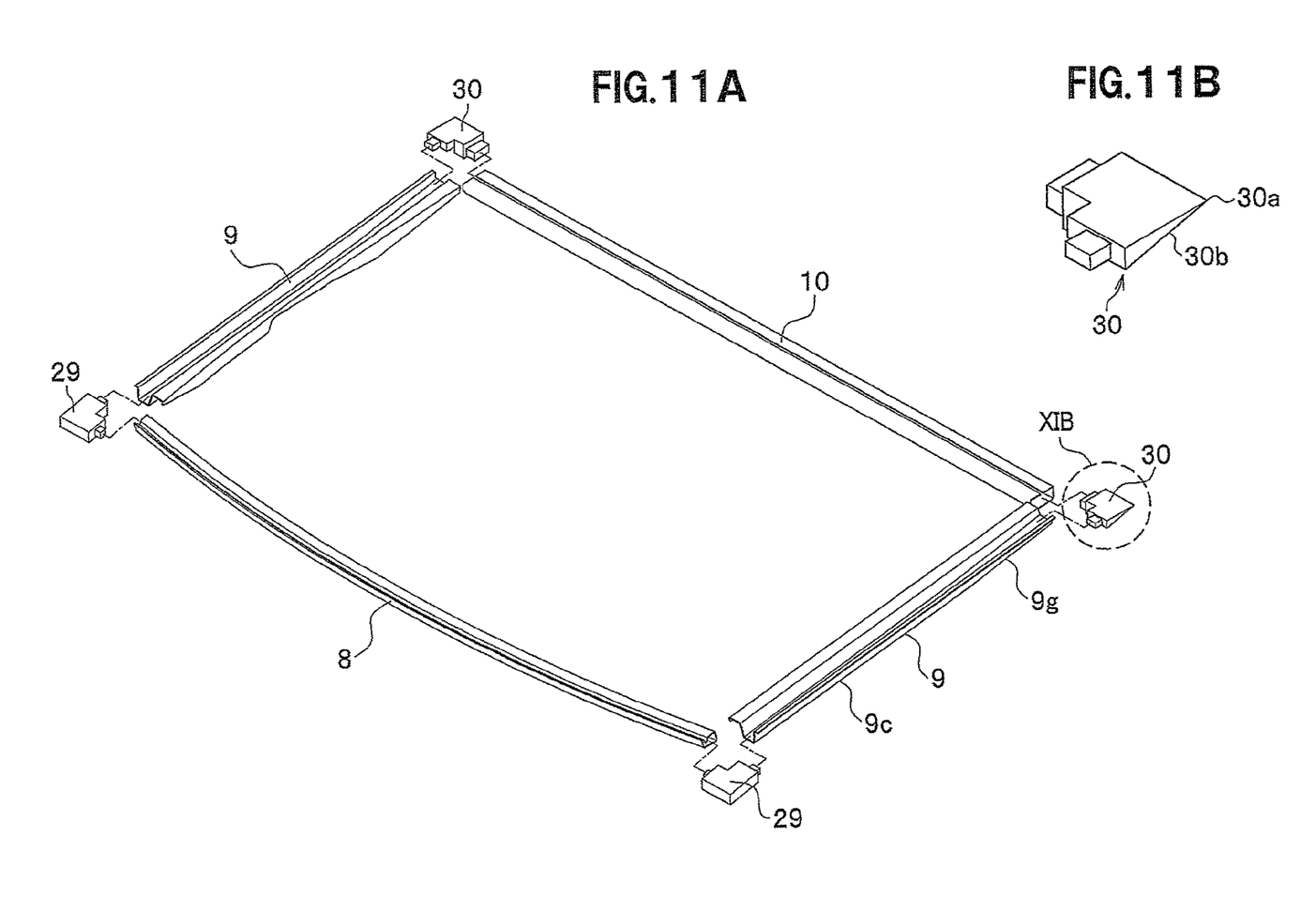
FIG. 11A is a perspective view illustrating appearance of respective front, side, and rear panel holders and front joint members and rear joint members connected to each panel holder.
FIG. 11B is an enlarged perspective view illustrating a rear joint member as denoted by XIB in FIG. 11A.

As illustrated in FIGS. 11A and 11B, front joint members 29 connect the front ends of the side panel holders 9 to both ends of the front panel holder 8. Rear joint members 30 connect the rear ends of the side panel holders 9 to both ends of the rear panel holder 10. Each of the upper surfaces of the front joint members 29 and the rear joint members 30 is appropriately bonded with, for example, adhesive to the lower surface of each of four corners of the roof panel 4. The front joint members 29 and the rear joint members 30 are made of, for example, a resin material.

As illustrated in FIG. 2, a front roof rail 15 is installed using adhesive 14 on the inner surface of the upper edge of the front window 5. The front roof rail 15 extends in a vehicle widthwise direction to retain strength of the front window 5 and is a member having a substantially closed sectional structure. The front roof rail 15 is formed by bending, such as roll forming, of a metal plate (e.g., a galvanized steel sheet).

As illustrated in FIG. 5, the front roof rail 15 includes, in the cross section, an attachment surface portion 15a which is bonded with adhesive 14 to the inner surface of the upper edge of the front window 5. The front roof rail 15 has an upper rear surface portion 15b that extends downward from the rear end of the attachment surface portion 15a and is substantially perpendicular to the window plane of the front window 5. The front roof rail 15 has an arc-shaped concave portion 15c that is bent rearward and somewhat upward like a concave shape from the lower end of the upper rear surface portion 15b. The front roof rail 15 has a support surface portion 15d that extends substantially horizontally and rearward from the rear end of the concave portion 15c. The front roof rail 15 has a lower rear surface portion 15e that extends substantially vertically and downward from the rear end of the support surface portion 15d. The front roof rail 15 has a lower surface portion 15f that extends from the lower end of the lower rear surface portion 15e and is inclined downward toward a front position. The front roof rail 15 has an inclined surface 15g that extends inclinedly from the front end of the lower surface portion 15f to a front position. The upper end of the inclined surface 15g is at the front end position of the front roof rail 15, and is bent upward to be connected to the front end of the attachment surface portion 15a.

According to this outline of the front roof rail 15, the sectional closed space 16 of the front roof rail 15 includes a narrowed portion 16c, in which the concave portion 15c and the inclined surface 15g are disposed close to each other, as an interface on the whole. The sectional closed space 16 includes a front space 16a and a rear space 16b having the narrowed portion 16c defining a boundary therebetween. The front space 16a is surrounded mainly by the attachment surface portion 15a, the upper rear surface portion 15b, and the inclined surface 15g. The rear space 16b is surrounded mainly by the support surface portion 15d, the lower rear surface portion 15e, and the lower surface portion 15f. The front space 16a is positioned immediately under the attachment surface portion 15a that is a portion fixed to the front window 5. The rear space 16b is connected to the lower rear position in the front space 16a, and is positioned under the front panel holder 8, that is, under the front edge of the closed roof panel 4.

Figure 6:
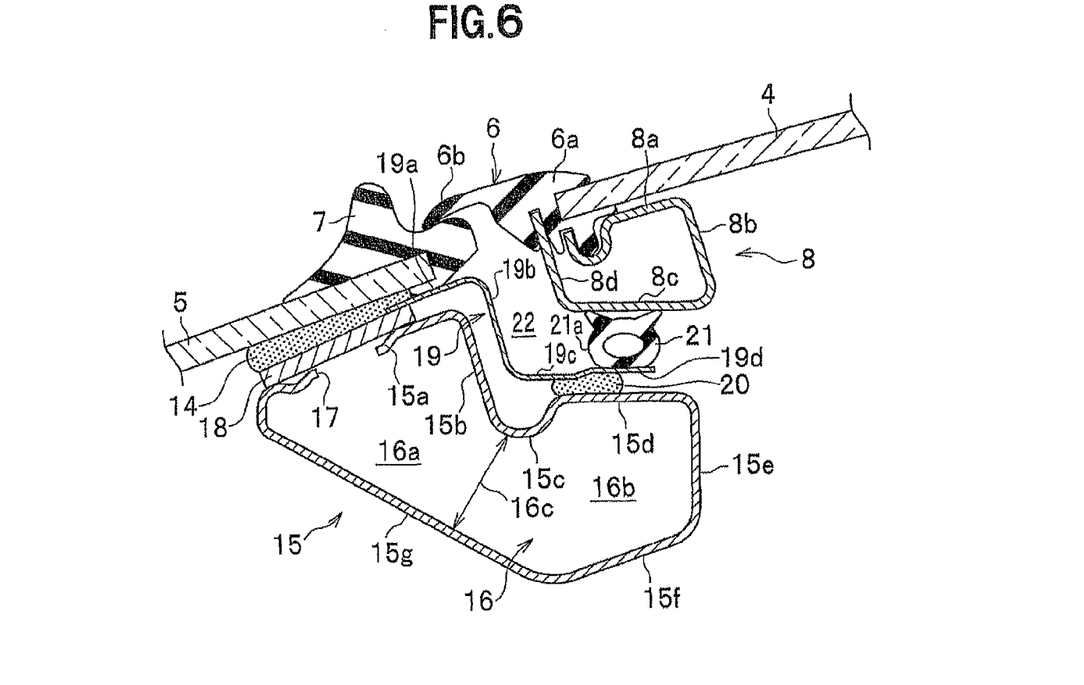
FIG. 6 is an enlarged sectional view illustrating a front edge portion of the roof panel of FIG. 2, and indicates a case with a patch member.

As described above, the front roof rail 15 is a member in which a single metal sheet is bent, so that a joint portion 17 of the sheet is formed. The front roof rail 15 as shown in FIG. 5 is formed with a joint portion 17 positioned at the attachment surface portion 15*a*. The joint portion 17 is closed with an adhesive 14, which increases rigidity of the front roof rail 15. As an alternative example, FIG. 6 shows a structure in which a patch member 18, another member, is attached by welding to close the joint portion 17. Note that in this case, it is unnecessary to close the joint portion 17 with adhesive 14. Accordingly, the front roof rail 15 may be formed with the joint portion 17 which is positioned at a portion other than the attachment surface portion 15*a*.

Next, a drain channel for draining rain water, etc., is disposed under the perimeter of the roof panel 4. First, as illustrated in FIG. 5, a front roof stiffener 19 is disposed above the front roof rail 15 and extends in a vehicle widthwise direction. The front roof stiffener 19 includes, in the cross section, a base plate portion 19*a* interposed between the upper edge of the front window 5 and the attachment surface portion 15*a* of the front roof rail 15. The front roof stiffener 19 has a side plate portion 19*b* that extends downward from the rear end of the base plate portion 19*a* and is substantially perpendicular to the window plane of the front window 5. The front roof stiffener 19 has a bottom plate portion 19*c* that extends substantially horizontally and rearward from the lower end of the side plate portion 19*b*. The front roof stiffener 19 has a seal attachment plate portion 19*d* that extends rearward from the rear end of the bottom plate portion 19*c*. The seal attachment plate portion 19*d* is bent somewhat upward and extends substantially horizontally and rearward. The front end of the base plate portion 19*a* of the front roof stiffener 19 is fixed to the front window 5 and the attachment surface portion 15*a* of the front roof rail 15 with an adhesive 14. In the front roof stiffener 19, the lower surface of each of the bottom plate portion 19*c* at a posterior side and the seal attachment plate portion 19*d* are fixed to the support surface portion 15*d* of the front roof rail 15 with an adhesive 20.

A seal member 21 that extends in a vehicle widthwise direction is fixed with, for example, an adhesive to the upper surface of the seal attachment plate portion 19*d*. The seal member 21 is made of, for example, a hollow, closed, sectional rubber material. The lower surface portion 8*c* of the front panel holder 8 pressingly contacts the seal member 21 when closed. This makes the front edge portion of the roof panel 4 watertight to prevent water from infiltrating into a vehicle interior. That is, the front edge of the roof panel 4 is placed over the rear space 16*b* of the front roof rail 15 with the front roof stiffener 19 interposed therebetween. Then, a drain channel 22 is defined by the side plate portion 19*b*, the bottom plate portion 19*c*, and a side surface 21*a* that is on a front side of the seal member 21. Water in the drain channel 22 is drained via a front pillar through drain holes (not shown) that have been formed at or near both ends of the drain channel 22 in the vehicle widthwise direction.

As illustrated in FIG. 4, a side roof stiffener 23 is disposed below a side edge of the roof panel 4 and extends in a front-rear direction of a vehicle. The side roof stiffener 23 includes, in the cross section, a substantially horizontal connecting plate portion 23*a* that is connected to a vehicle framework (not shown). The side roof stiffener 23 has a first side plate portion 23*b* that extends substantially vertically and downward from an end of the connecting plate portion 23*a* at a center side in the vehicle widthwise direction. The side roof stiffener 23 has a bottom plate portion 23*c* that extends substantially horizontally toward a center side in the vehicle widthwise direction from the lower end of the first side plate portion 23*b*. The side roof stiffener 23 has a second side plate portion 23*d* that extends substantially vertically and upward from an end of the bottom plate portion 23*c* at a center side in the vehicle widthwise direction. The side roof stiffener 23 has a seal attachment plate portion 23*e* that extends inclinedly and somewhat upward from the upper end of the second side plate portion 23*d* toward a center side in the vehicle widthwise direction.

A seal member 24 that extends in a front-rear direction of the vehicle is fixed with, for example, an adhesive to the upper surface of the seal attachment plate portion 23*e*. Note that this seal member 24, the above seal member 21, and a below-described seal member 27 are members that are integrated as a rectangular frame. The lower surface portion 9*c* of the side panel holder 9 pressingly contacts the seal member 24 when closed. This makes the side edge portion of the roof panel 4 watertight to prevent water from infiltrating into a vehicle interior. Then, a drain channel 25 is defined by the first side plate portion 23*b*, the bottom plate portion 23*c*, and the second side plate portion 23*d*. Water in the drain channel 25 is drained via, for example, a front pillar and/or a center pillar through a drain hole (not shown).

As illustrated in FIG. 7, a rear roof stiffener 26 is disposed below the rear edge of the roof panel 4 and extends in the vehicle widthwise direction. Note that this rear roof stiffener 26, the above front roof stiffener 19, and the side roof stiffeners 23 are members which are integrated as a rectangular frame. The rear roof stiffener 26 includes, in the cross section, a substantially horizontal connecting plate portion 26*a* that is connected to a vehicle framework (not shown). The rear roof stiffener 26 has a side plate portion 26*b* that extends downward from the front end of the connecting plate portion 26*a*. The rear roof stiffener 26 has a bottom plate portion 26*c* that extends substantially horizontally and forward from the lower end of the side plate portion 26*b*. The rear roof stiffener 26 has a seal attachment plate portion 26*d* that extends forward from the front end of the bottom plate portion 26*c*. The seal attachment plate portion 26*d* is bent somewhat upward and extends forward and substantially horizontally.

The upper surface of the seal attachment plate portion 26*d* has a seal member 27 that extends in the vehicle widthwise direction fixed thereto with, for example, an adhesive. When the roof panel 4 is closed, the front panel holder 8 and the side panel holder 9 pressingly contact the seal members 21 and 24, respectively, as described about the front edge and the side edge of the roof panel 4. With regard to the rear edge of the roof panel 4, the rear panel holder 10 does not pressingly contact the seal member 27. The lower surface of the rear edge of the roof panel 4 pressingly contacts the seal member 27. This makes the rear edge portion of the roof panel 4 watertight to prevent water from infiltrating into a vehicle interior. Then, a drain channel 28 is defined by the side plate portion 26*b*, the bottom plate portion 26*c*, and a side surface 27*a* that is on a rear side of the seal member 27. Water in the drain channel 28 is drained via a center pillar through drain holes (not shown) that has been formed at or near both ends of the drain channel 28 in the widthwise direction.

Figure 12A:
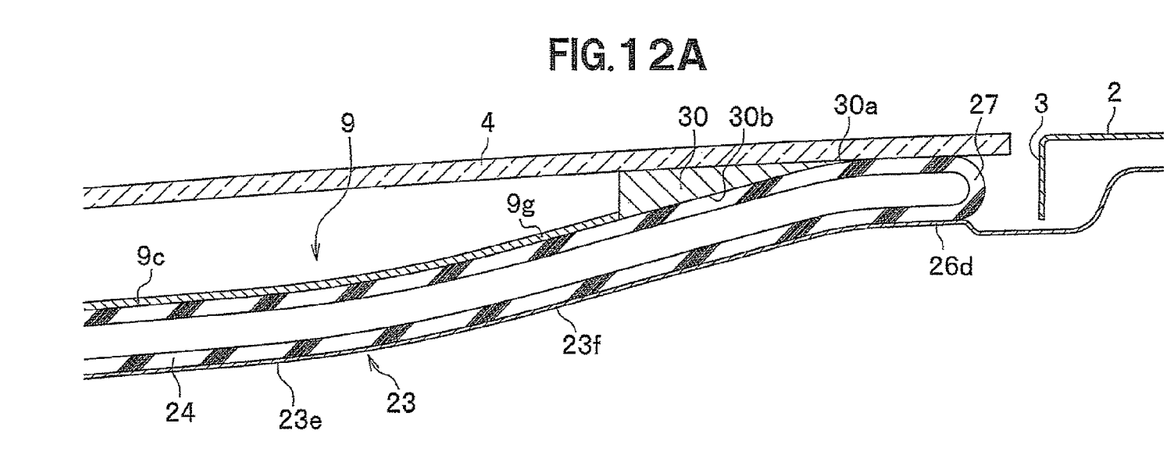
FIG. 12A shows the case with an interposed rear joint member.

Here, with regard to the rear edge of the roof panel 4, the following problem arises due to the structure in which the seal member 27 directly and pressingly contacts the lower surface of the roof panel 4 without the rear panel holder 10 interposed therebetween. As illustrated in FIG. 4, at the side edge of the roof panel 4, the side panel holder 9 pressingly contacts the seal member 24. Accordingly, the roof panel 4 and the seal member 24 have therebetween a distance corresponding to a height of the side panel holder 9. In contrast, the roof panel 4 and the seal member 27 have therebetween no distance as illustrated in FIG. 7. As shown in FIG. 12A, the rear portion of the seal attachment plate portion 23*e* of the side roof stiffener 23 is formed as an inclined surface 23*f* which gradually comes close to the roof panel 4 as extending to the rear end. Accordingly, in order to pressingly contact the seal member 24 inclinedly disposed on the inclined surface 23f, the rear portion of the lower surface portion 9c of the side panel holder 9 is formed as an inclined surface 9g (also see FIG. 11A) which gradually comes close to the roof panel 4 as extending to the rear end.

Figure 12B:
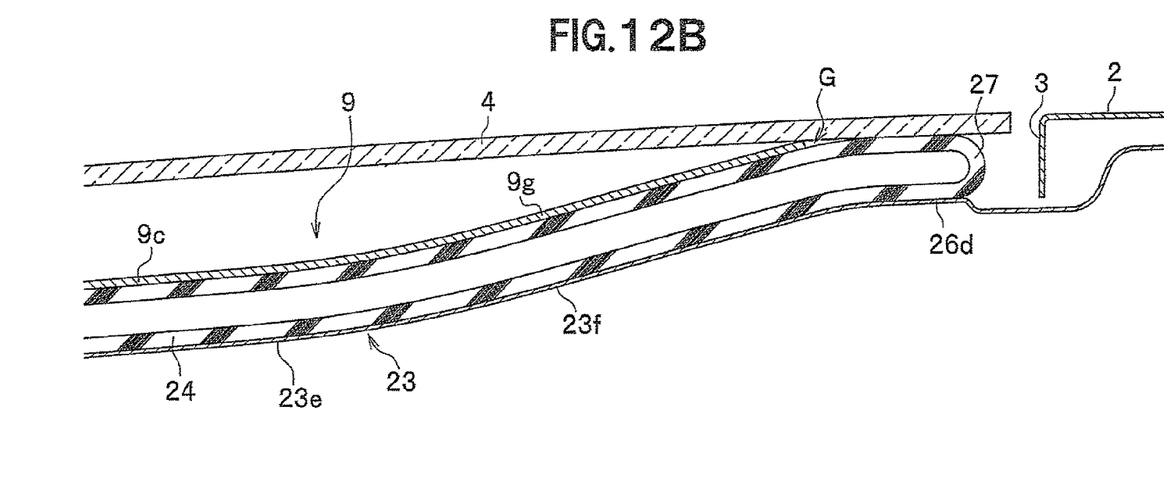
FIG. 12B shows the case without an interposed rear joint member.

If the side panel holder 9 extends rearward without modification as illustrated in FIG. 12B, a plate thickness of the lower surface portion 9c causes a gap G among the rear end of the lower surface portion 9c, the roof panel 4, and the seal member 24. This may result in an insufficient watertight condition. In contrast, the rear joint member 30 may be disposed at the rear of the side panel holder 9 and between the roof panel 4 and the seal member 24 as illustrated in FIG. 12A, which prevents formation of the above gap G. The lower surface of the rear joint member 30 is inclined, and the lower surface and the inclined surface 9g of the side panel holder 9 are flush with each other. In addition, the inclined surface 30b extends to the position where it comes in the vicinity of or in contact with the lower surface of the roof panel 4 (also see FIG. 11A). This construction eliminates the gap G, and ensures a predetermined watertight function. The side panel holder 9 is a sheet metal member, and it is almost impossible to cut the rear end of the lower surface portion 9c at an acute angle so as not to produce a gap G. In contrast, if the rear joint member 30 is made of a resin material with excellent moldability, the rear end portion 30a of the rear joint member 30 is easily molded as a pointed portion with an acute angle.

The following describes an opening-closing mechanism of the roof panel 4. In FIG. 4, a guide frame 31 that extends in a front-rear direction of a vehicle is disposed at the lower side of both side edges of the roof panel 4. The guide frame 31 includes, in the cross section, a cable channel 33 for inserting a push-pull cable 32 that moves forward and rearward by using a diving motor (not shown). The guide frame 31 includes a guide rail channel 35 for guiding a drive slider 34, connecting to the push-pull cable 32 (the connection between both is not depicted), to be slid in a forward-rearward direction. The guide frame 31 is made of, for example, an extruded material of an aluminum-alloy.

The drive slider 34 includes a main portion 34A of a vertical plate that stands along the guide frame 31. The drive slider 34 has a plurality of shoes 34B that project in a left-right direction from the lower portions of the front and rear ends of the main portion 34A and that can slide along the guide rail channel 35. The shoes 34B and the main portion 34A may be integrated, or may be separate members. The main portion 34A, as illustrated in FIG. 2, includes a first lift guide channel 36 and a second lift guide channel 37, which extend through the main portion 34A in a left-right direction, in the order from the front to the rear of the vehicle.

The first lift guide channel 36 of a shape includes: a first horizontal stroke 36A that extends substantially horizontally; a first inclined stroke 36B that extends slightly inclinedly and upward from the front end of the first horizontal stroke 36A; a second horizontal stroke 36C that extends substantially horizontally and forward from the upper end of the first inclined stroke 36B; and a second inclined stroke 36D that extends inclinedly and upward from the front end of the second horizontal stroke 36C. The second lift guide channel 37 of a shape includes: a first horizontal stroke 37A that extends substantially horizontally; an inclined stroke 37B that extends inclinedly and upward from the front end of the first horizontal stroke 37A; and a second horizontal stroke 37C that extends substantially horizontally and forward from the upper end of the inclined stroke 37B.

Figure 3:
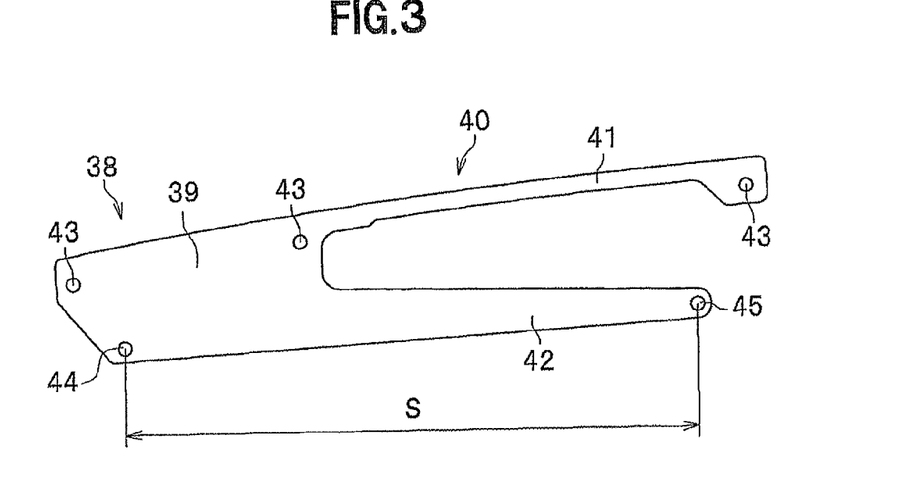
FIG. 3 is a side view of a panel support stay.

The roof panel 4 and the drive slider 34 have a panel support stay 38 interposed therebetween. With reference to FIGS. 2 and 3, the panel support stay 38 is a vertical plate member. The panel support stay 38 includes a base plate portion 39 which is formed at a front side and a forked portion 40 which is formed at a rear side. The forked portion 40 is constructed as a fork in such a manner that an upper-side portion 41 connecting to the roof panel 4 and a lower-side portion 42 engaging the drive slider 34 create an opening in a rearward direction. The upper-side portion 41 extends along the lower surface of the roof panel 4 in a substantially forward-rearward direction, and the rear end thereof is connected and fixed to one of connecting pins 43. The lower-side portion 42 also extends in a substantially forward-rearward direction, and the rear end thereof is fixed to a second lift guide pin 45 as described below.

In FIG. 4, part of the side panel holder 9 is constructed as the vertical plate bracket portion 9f as described above. As illustrated in FIG. 2, this bracket portion 9f is connected and fixed using a plurality of connecting pins 43 to the upper-side portion 41; and the upper edge portion of the base plate portion 39 of the panel support stay 38. In addition, a first lift guide pin 44 is fixed to the front end of the lower edge of the base plate portion 39 of the panel support stay 38. A second lift guide pin 45 is fixed to the rear end of the lower-side portion 42. The first lift guide pin 44 and the second lift guide pin 45 slidably engage the first lift guide channel 36 and the second lift guide channel 37, respectively, of the drive slider 34.

Note that the panel support stay 38 and the side panel holder 9 may be integrated or the panel support stay 38 may be directly fixed with, for example, an adhesive to the lower surface of the roof panel 4 regardless of the side panel holder 9.

<Operation>

Figures 8A, 8B:
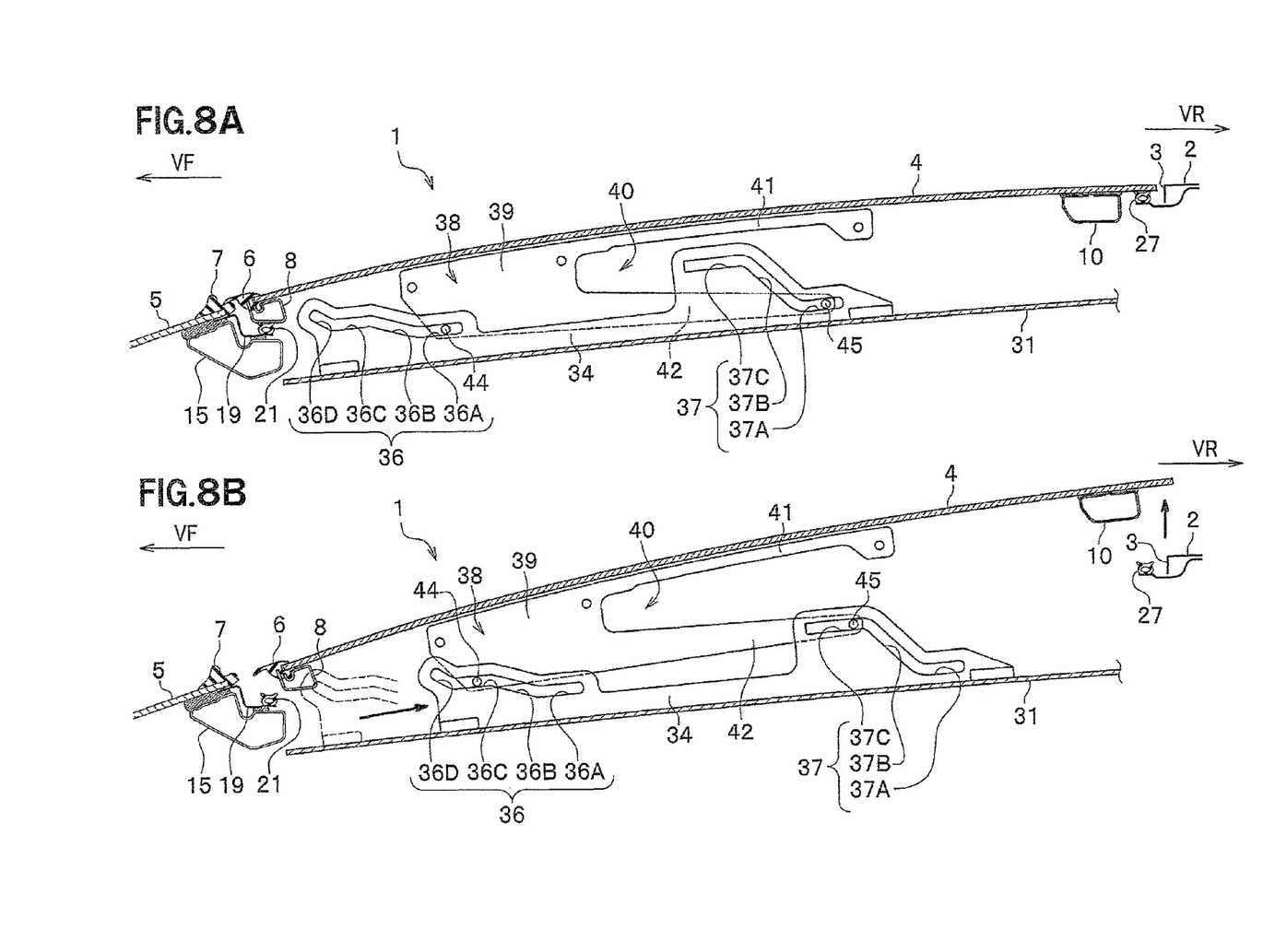
FIGS. 8A and 8B are side views illustrating operation of a sunroof apparatus according to an embodiment of the present invention operates.

With reference to FIGS. 8A and 8B and FIGS. 9A and 9B, etc., the following describes the operation of the sunroof apparatus 1. Note that in FIGS. 8A and 8B and FIGS. 9A and 9B, the bracket portion 9f of the side panel holder 9 is omitted. FIG. 8A depicts a fully closed state of the roof panel 4. At that time, the drive slider 34 is at the most front position. The first lift guide pin 44 is positioned at the first horizontal stroke 36A of the first lift guide channel 36. The second lift guide pin 45 is positioned at the first horizontal stroke 37A of the second lift guide channel 37. In the front edge of the roof panel 4, the front panel holder 8 pressingly contacts the seal member 21. In the side edge of the roof panel 4, the side panel holder 9 pressingly contacts the seal member 24 (see FIG. 4). In the rear edge of the roof panel 4, the lower surface of the roof panel 4 pressingly contacts the seal member 27. This construction keeps the roof panel 4 watertight.

A motor (not shown) is actuated and the drive slider 34 moves rearward using the push-pull cable 32 (FIG. 4) from the state illustrated in FIG. 8A. At that time, the inner wall of the first inclined stroke 36B of the first lift guide channel 36 lifts the first lift guide pin 44. Together with that, the inner wall of the inclined stroke 37B of the second lift guide channel 37 lifts the second lift guide pin 45. Consequently, the roof panel 4 somewhat moves rearward and is tilted up. FIG. 8B depicts a state in which the tilt-up has been completed. The first lift guide pin 44 is positioned at the second horizontal stroke 36C of the first lift guide channel 36. The second lift guide pin 45 is positioned at the second horizontal stroke 37C of the second lift guide channel 37.

Figure 9A:
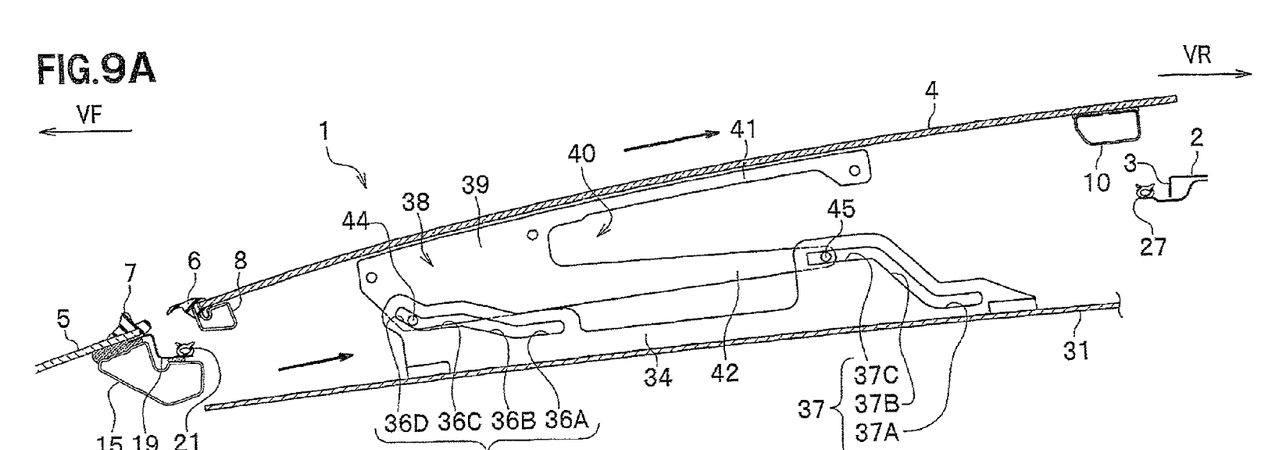
FIGS. 9A and 9B are side views illustrating operation of a sunroof apparatus according to an embodiment of the present invention.

The drive slider 34 further moves rearward from the state illustrated in FIG. 8B. At that time, as illustrated in FIG. 9A, the inner wall of the second inclined stroke 36D of the first lift guide channel 36 pushes the first lift guide pin 44 rearward, so that the roof panel 4 slides rearward.

Figure 9B:
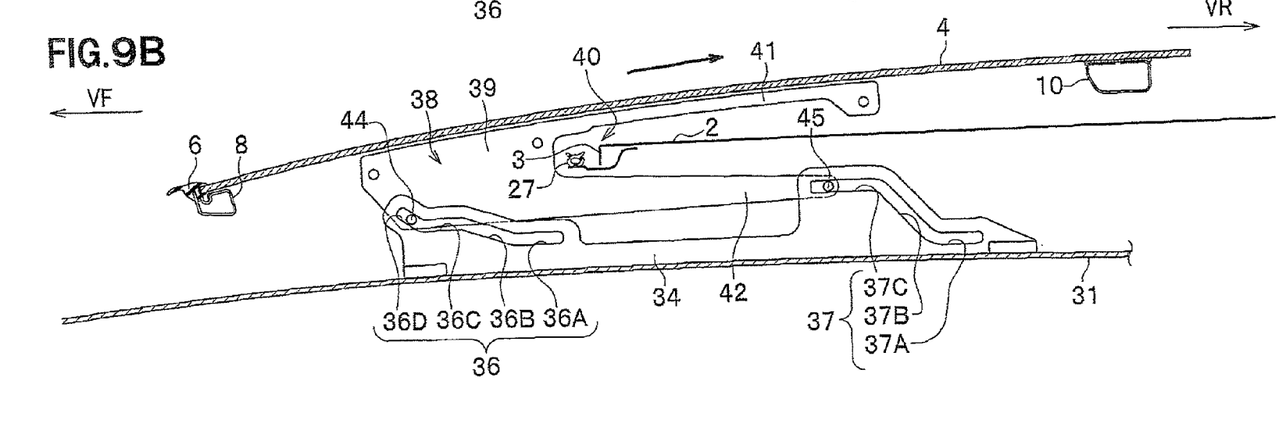

FIG. 9B depicts the fully open state of the opening portion 3 in which state the roof panel 4 moves to the most rear position. The upper-side portion 41 of the panel support stay 38 is positioned above a fixed roof 2 at the rear of the opening portion 3. The lower-side portion 42 is positioned below the fixed roof 2. That is, the fixed roof 2 at the rear of the opening portion 3 intervenes between the forked portions 40 of the panel support stay 38. FIG. 9B clearly demonstrates that the second lift guide pin 45 is positioned at the rear of the rear edge of the opening portion 3.

JP-2005-41345A discloses a conventional structure in which when an opening portion is fully open, both two pins connecting a panel support stay and a slider are positioned in front of the rear edge of the opening portion. Unless the front end of a guide rail extends forward and the pin at a front side is positioned forward, it is difficult for this conventional structure to have an enough distance between two pins, namely, a support span to support roof panel's weight applied on the slider. In this conventional structure, the positions of two pins are shifted much more forward than the center of gravity of the roof panel. Thus, their moment becomes too large, and the panel support stay is likely to have more loads applied thereto.

In contrast, in the present structure, when the opening portion 3 is fully open, the second lift guide pin 45 is positioned at the rear of the rear edge of the opening portion 3. That is, the panel support stay 38, which is a part of supporting weight of the roof panel 4, and a part of an engaging portion of the drive slider 34 are positioned at the rear of the rear edge of the opening portion 3. This construction enables the support span S (FIG. 3) of the roof panel 4 to be elongated while keeping a degree of opening of the opening portion 3 without taking a series of measures such as extending the front end of the guide frame 31 forward. In addition, a support portion to bear weight of the roof panel 4 is shifted more rearward than that of a conventional one to be positioned close to the center of gravity of the roof panel 4, which reduces a load applied to the panel support stay 38.

Further, as a shape of the panel support stay 38, the forked portion 40 is constructed like a fork in such a manner that an upper-side portion 41 fixed to the roof panel 4 and a lower-side portion 42 engaged with the drive slider 34 are used to create opening in a rear direction. As illustrated in FIG. 9B, when the opening portion 3 is fully open, the fixed roof 2 at the rear of the opening portion 3 is interposed between the forked portions 40. This structure enables the support span S of the roof panel 4 to be elongated while making the structure of the panel support stay 38 simple.

As described above, with regard to the sunroof apparatus 1, the upper edge of the front window 5 is continuous to the front edge of the movable roof panel 4 without an outer roof board of the fixed roof 2 interposed therebetween. This construction allows for closure of the opening portion 3 of the roof. Then, this construction enlarges the visual field extending obliquely upward in a forward direction because there is no outer roof board between the front window 5 and the roof panel 4. In addition, a conventional technology (e.g., JP-2010-163112A) discloses that a front roof rail is separated into two members (upper and lower members) which are welded using a flange portion. The flange portion tends to limit the visual field. Meanwhile, the front roof rail 15 according to this embodiment is constructed in such a way that one metal sheet is bent to form a substantially sectional closed structure. This construction does not need the flange portion, which further enlarges the visual field extending obliquely upward in a forward direction. The front roof rail 15 is constructed in such a way that at least a part (the front space 16a) of the sectional closed space 16 is placed immediately below the attachment portion of the front window 5. This construction sufficiently ensures a function of reinforcing the front window 5.

The joint portion 17 between plates of the front roof rail 15 is closed by the patch member 18, which further enhances rigidity (mostly torsional rigidity) of the front roof rail 15. In this embodiment, the adhesive 14 is used to adhere the front roof rail 15 to the front window 5. In this construction, if the joint portion 17 is closed with the adhesive 14, this simple structure increases rigidity of the front roof rail 15.

Figure 10:
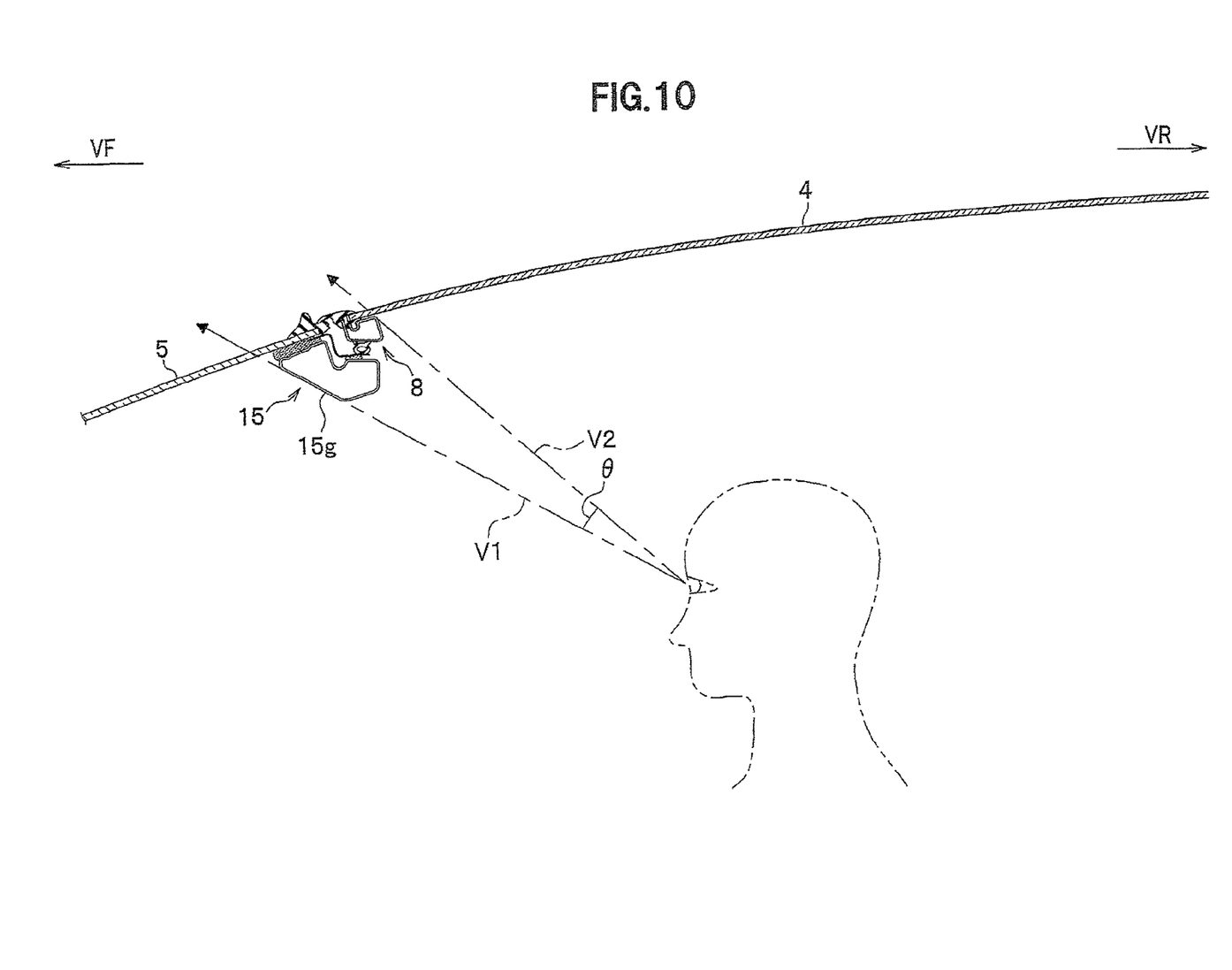
FIG. 10 illustrates condition of the visual field around a front roof rail when viewed from a side.

When the opening portion 3 is closed, the front edge of the roof panel 4 is placed over the sectional closed space 16 of the front roof rail 15, specifically, over the rear space 16b. This construction makes it possible to effectively bear loads from the roof panel 4 because of a rigidity function of the sectional closed space 16. There is no need to create an additional flange portion, etc., for placing the front edge of the roof panel 4. This makes a placement space compact. As illustrated in FIG. 10, a small intersecting angle θ between the visual line V1 and the visual line V2 enlarges the visual field extending obliquely upward in a forward direction.

The apparatus includes the front roof rail 15 with a structure in which at least part (the front space 16a) of the sectional closed space 16 is placed immediately below the attachment portion of the front window 5. In this case, the front lower portion of the front roof rail 15 has the inclined surface 15g that is inclined upward in a forward direction and whose upper end is at the most front position of the front roof rail 15. As illustrated in FIG. 10, this construction makes it possible to ensure the visual line V1 from a seated person along the inclined surface 15g, which enlarges the visual field with regard to the front window 5.

When the opening portion 3 is closed, the front panel holder 8 pressingly contacts the seal member 21 at the front edge of the roof panel 4 and the lower surface of the roof panel 4 pressingly contacts the seal member 27 at the rear edge of the roof panel 4. This construction makes a vertical space of a seal structure around the rear edge of the roof panel 4 smaller than that of the structure in which the rear panel holder 10 pressingly contacts the seal member 27. This construction ensures a large head clearance.

As illustrated in FIG. 12A, the apparatus includes the resin-made rear joint member 30 having the inclined surface 30b which is inclined upward as extending rearward with the rear end portion 30a coming in the vicinity of or in contact with the lower surface of the roof panel 4. The inclined surface 30b of the rear joint member 30 pressingly contacts the seal member 24 from the position of pressingly contacting the side panel holder 9 to the position of pressingly contacting the lower surface of the rear edge of the roof panel 4. This construction prevents occurrence of the gap G between the roof panel 4 and the seal member 24 as illustrated in FIG. 12B, which enhances watertightness of the seal member 24.

The front roof stiffener 19 and the rear roof stiffener 26 include the drain channels 22 and 28, respectively. The seal members 21 and 27 serve as parts of channel walls of the drain channels 22 and 28. According to this construction, a part of the structure serves as the drain function and the watertight function of the roof panel. This construction makes the structure surrounding the drain channels 22 and 28 compact. In addition, the sectional shapes of the front roof stiffener 19 and the rear roof stiffener 26 become simple shapes. Of course, with regard to the side roof stiffener 23, the seal member 24 may be a part of a channel wall of the drain channel 25.

Hereinabove, preferred embodiments of the present invention have been described. In the embodiments described, the drive slider 34 is constructed with a single body, but a slider may have separate units.

According to the sunroof apparatus, the lower surface of the rear edge of the roof panel pressingly contacts the seal member, and a vertical space of a seal structure around the rear edge of the roof panel is reduced, which ensures a large head clearance.

The sunroof apparatus prevents a gap between the roof panel and the seal member from occurring, and enhances watertightness of the seal member.

What is claimed is:

1. A sunroof apparatus comprising:
   a movable roof panel including a front edge connected to an upper edge of a front window without a roof outer plate interposed between the roof panel and the front window for closing an opening portion of a roof;
   a seal member disposed at a whole circumference of an edge portion of the opening portion; and
   a front panel holder fixed to a lower surface of at least the front edge of the roof panel for reinforcing the roof panel,
   wherein with the opening portion of the roof closed by the roof panel, the front panel holder pressingly contacts with the seal member at the front edge of the roof panel, and a lower surface of the roof panel pressingly contacts directly with the seal member at a rear edge of the roof panel,
   wherein the roof panel includes a side edge having a side panel holder, for reinforcing the roof panel, fixed to a lower surface of the side edge,
   wherein the rear edge of the roof panel has a rear panel holder, for reinforcing the roof panel, fixed on a lower surface of the rear edge,
   wherein with the opening portion of the roof closed by the roof panel, the side panel holder pressingly contacts with the seal member at the side edge of the roof panel,
   wherein a rear end of the side panel holder and each of left and right ends of the rear panel holder are connected by a rear joint member disposed on the lower surface of the roof panel,
   wherein the rear joint member includes a lower surface serving as an inclined surface,
   wherein the inclined surface is inclined upward relative to the lower surface of the roof panel as the inclined surface extends rearward with a rear end of the inclined surface coming close to or in contact with the lower surface of the roof panel, and
   wherein the inclined surface pressingly contacts with the seal member extending from a pressure-contact portion with the side panel holder to a pressure-contact portion with the lower surface of the rear edge of the roof panel.

* * * * *